United States Patent

[11] 3,617,925

[72] Inventors William D. Bensema; Robert M. Coon; Wesley M. Beery; Clark C. Watterson; Earl C. Bolton, all of Boulder, Colo.

[21] Appl. No. 44,842
[22] Filed June 9, 1970
[45] Patented Nov. 2, 1971
[73] Assignee The United States of America as represented by the Secretary of Commerce

[54] SIMULATOR FOR ATMOSPHERIC RADIO NOISE
17 Claims, 4 Drawing Figs.

[52] U.S. Cl. .................................................. 331/78, 331/47
[51] Int. Cl. .................................................. H03b 29/00
[50] Field of Search .................................................. 331/78, 47

*Primary Examiner*—John Kominski
*Attorneys*—David Robbins and Alvin J. Englert

ABSTRACT: One-shot multivibrators generate random impulses that have a nonperiodic repetition rate and selected probabilities of occurrence. Each of several analog gates has a different probability that it will open during a predetermined time interval; the durations of the open-periods have random values. When an analog gate is open, it passes a burst of impulses generated by the multivibrators during the open-period. In another source Gaussian noise is also generated. The impulses and bursts are applied to an amplitude modulator. A portion of the noise frequency band functions as a modulating signal so that the impulses in the modulator output have amplitudes that vary randomly. Gaussian noise is added to the modulator output before a final band-pass filter in the simulator.

SIMULATOR FOR ATMOSPHERIC RADIO NOISE

BACKGROUND OF THE INVENTION

This invention relates to an electrical noise generator and in particular to a simulator for atmospheric radio noise.

Atmospheric radio noise, generated by lightning, has been the subject of much research and study for many years. Such effort has been prompted by a variety of interests, but the most common one has been its relationship to its disturbance to radio communications.

During the very early days of radio development, it was discovered that thunderstorm activity was extremely troublesome to radio reception at low operating frequencies but became less so as the operating frequency was pushed higher and higher. The power radiated from a lightning discharge is greatest in the very low frequency (VLF) band of the radio spectrum and decreases more or less linearly with increasing frequency. Its disturbance is, therefore, most serious in the VLF band and, for most radio communication purposes, is not a serious problem above the high frequency (HF) band.

Atmospheric noise at VLF frequencies and below is made-up of isolated strong impulses. At HF frequencies, atmospheric noise is made up of "bursts" of impulses very closely spaced, with the bursts lasting from a few tens of milliseconds to several hundred milliseconds. In the medium frequency band, atmospheric noise is a mixture of these two types. Thus, a good atmospheric noise simulator, to be useful over a wide range of frequencies, must provide both types of noise, in an independently variable manner.

At present it is difficult to derive a satisfactory mathematical model for making accurate theoretical predictions of the performance of a communication system operating in an atmospheric noise environment. To obtain performance information, onsite tests must be made. Since there are strong geographical, seasonal, and diurnal influences upon the characteristics of atmospheric noise and since there is wide variability due to weather conditions, performance tests are frequently costly operations. This is particularly so when the tests are to be rather exhaustive and the environmental noise conditions are closely specified.

Using the principles of the present invention an atmospheric noise simulator may be constructed to circumvent the need for performing onsite tests. The simulator offers the following advantages:

a. Availability. The simulator provides immediate access to the desired noise conditions without having to move to a suitable locale and wait for specific noise conditions to develop.

b. Stationarity. Stationary noise statistics make it practical to perform tests involving a number of hours, whereas the statistics for true atmospheric noise generally change so rapidly that such tests are rendered impractical.

c. Repeatability. The simulator can offer accurately defined and controlled conditions for comparison testing of one system at one time and place against other systems at other times or places, or for repeated testing of the same system after adjustments or modifications have been made.

d. Range. The simulator is flexible and can provide test conditions that extend to or beyond extremely rare conditions found in nature.

e. Cost. Laboratory measurements involving the use of the simulator can be made much more quickly and economically than simular on-site measurements.

SUMMARY OF THE INVENTION

In accordance with the present invention, three types of signals are generated by a simulator: a Gaussian noise signal, random impulses at a number of predetermined levels with a selected probability of occurrence at each level, and bursts of similar impulses that occur randomly with random durations. The latter two signals are applied to an amplitude modulator, and a portion of the frequency band of the Gaussian noise signal is used to modulate the impulses to provide output impulses with a continuous amplitude distribution. The latter impulses are summed with unused Gaussian noise and filtered to provide the desired output atmospheric noise.

DESCRIPTION OF THE PREFERRED EMBODIMENT

Figure 1:
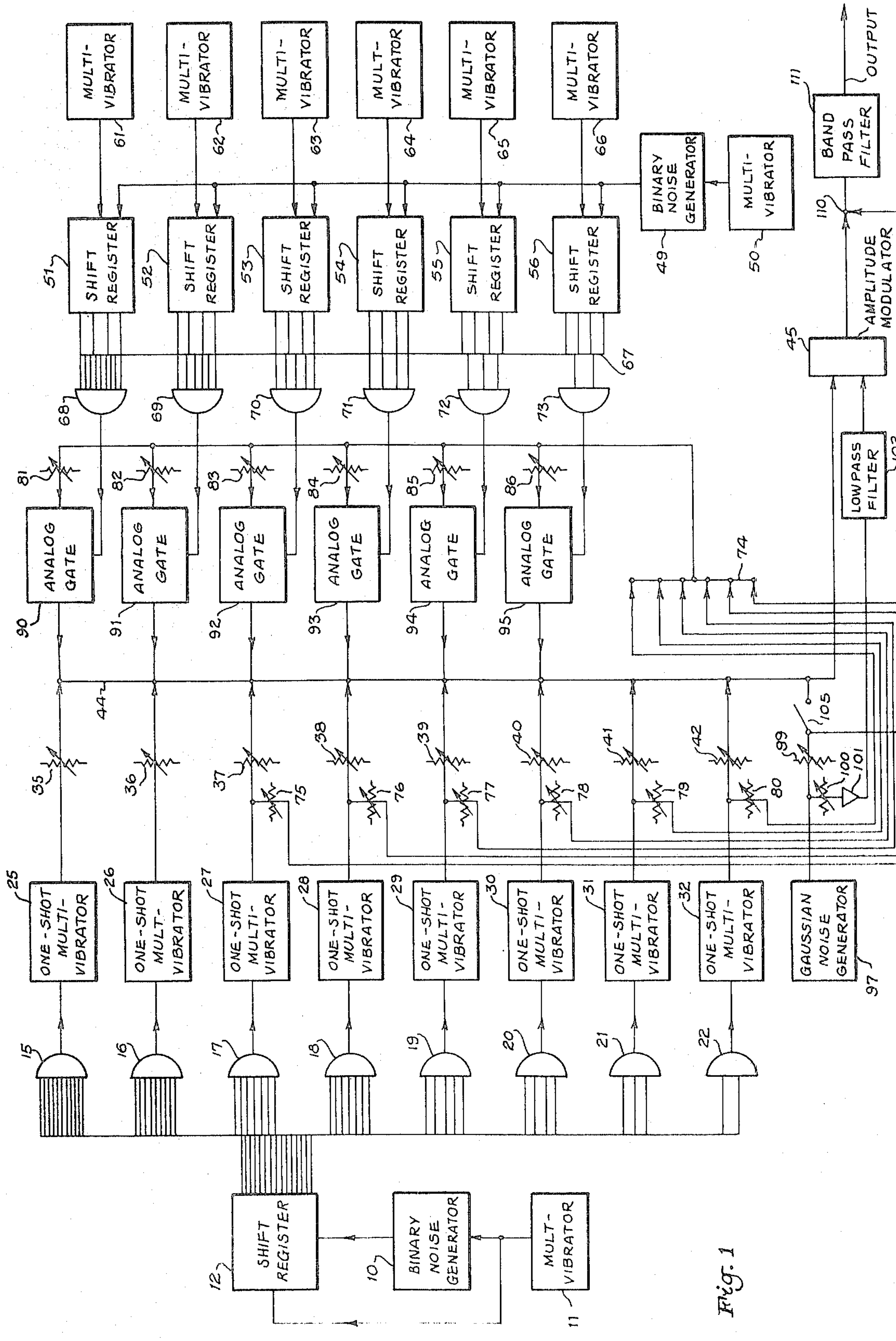
FIG. 1 represents an embodiment of the present invention.

With reference to FIG. 1, binary noise generator 10 is a highly stable noise source that exhibits stationary time statistics and develops a random binary waveform with transitions occuring at a rate determined by the clock signal provided by multivibrator 11. The binary waveform is applied to the input of shift register 12 which is shifted by the output of the multivibrator. In this embodiment, 12 is a 25-bit shift register and 11 is 50kHz. multivibrator.

The stages in register 12 are connected to AND gates 15 to 22 in such a manner that their outputs provide a wide range of probabilities for triggering one-shot multivibrators 25 to 32. Multivibrator 25, for example, operates at a relatively low probability ($p=½^{21}$, where 21 is the number of inputs to gate 15) to generate impulses that occur very rarely, while multivibrator 32 operates at a much higher probability ($p=½^{4}$) to generate impulses that occur very frequently. The multivibrators 26 to 31 develop impulses having intermediate probabilities.

Thus, multivibrators 25 to 32 produce random impulses that have a nonperiodic repetition rate, each impulse having a selected probability of occurrence. If it is desired that a multivibrator produce an impulse with a certain probability of occurrence, the required number of states in register 12 are connected to the inputs of the AND-gate 15 to 22 associated with the multivibrator. The time distribution of the impulses produced by the multivibrator may be adjusted to increase the correlation between successive impulses in time by "-bunching" the stages of register 12, i.e., by connecting the inputs of the related AND gate to adjacent stages of the register.

The outputs of one-shot multivibrators 25 to 32 are applied through attenuators 35 to 42, respectively, and summing bar 44 to the input of amplitude modulator 45. The attenuators are adjusted so that the amplitude of the impulses derived from the outputs of the multivibrators differ in magnitude, the impulses obtained from 25 having the greatest and the impulses from 32 having the smallest amplitude. The impulses generated in this way are illustrated by impulses 46 in FIG. 3.

Binary noise generator 49 is similar in construction to generator 10 and develops a random binary waveform with transitions occurring at a rate determined by a clock signal generated by multivibrator 50. The latter waveform is applied in parallel to shift registers 51 to 56 which are shifted by the outputs of multivibrators 61 to 66, respectively. In this embodiment, the operating frequencies of multivibrators 50 and 61 to 66 are 20 Hz., 4.0 Hz., 3.5 Hz., 3.0 Hz., 2.5 Hz., 2.25 Hz., and 1.75 Hz., respectively. The operating frequencies of the multivibrators are asychronous and may be adjusted by a conventional arrangement, not shown.

Figures 2, 4:
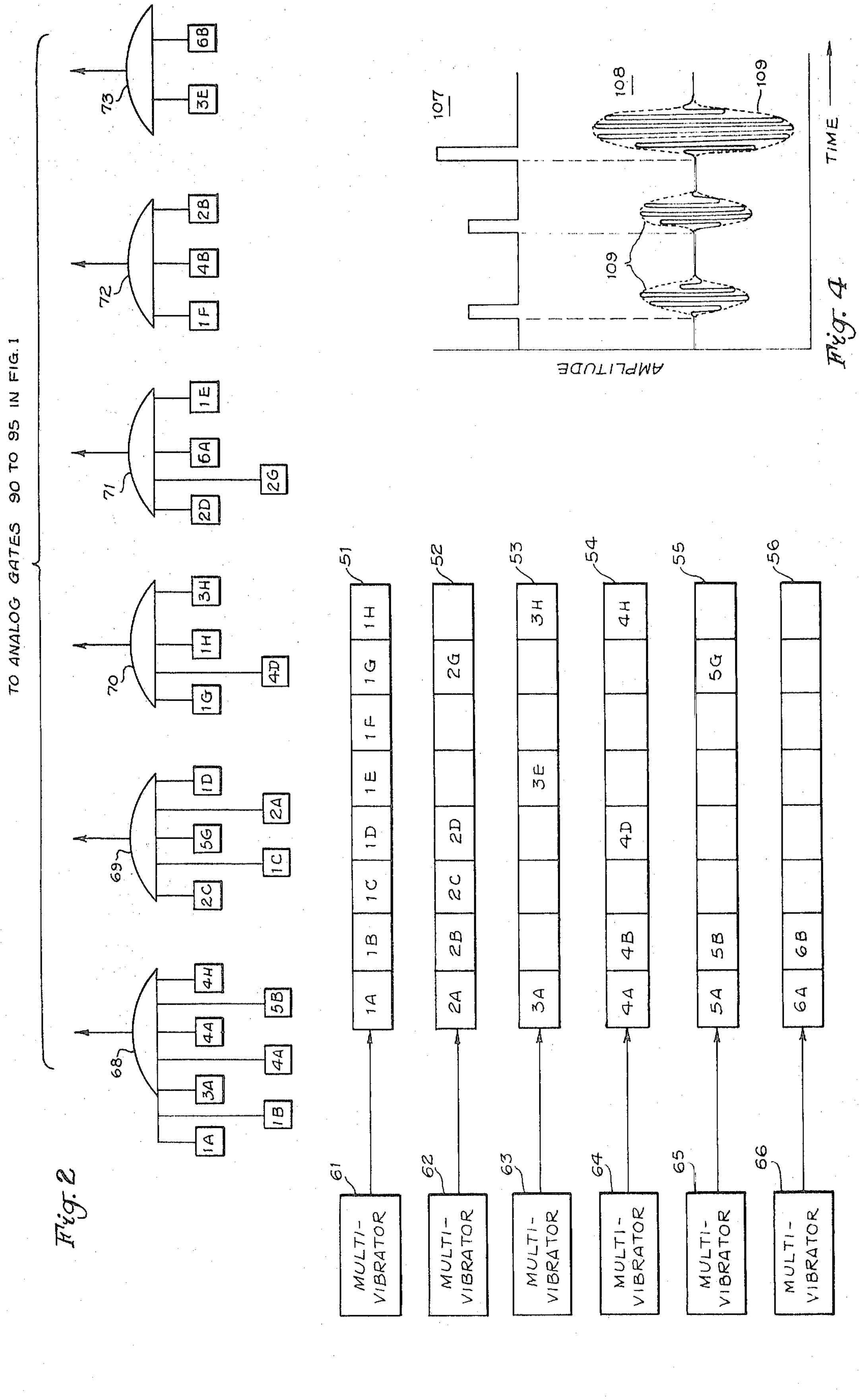
FIG. 2 illustrates the configuration of connections between AND gates and shift registers employed in FIG. 1.
FIGS. 3 and 4 illustrate waveforms generated by the embodiment in FIG. 1.

The stages in shift register 51 to 56 are connected to the inputs to AND-gates 68 to 73 by means of cable 67 in the manner illustrated in FIG. 2. As shown in this figure, each stage in a shift register 51 to 56 is represented by a rectangle and a designation. For example, register 51 comprises eight stages represented by eight boxes denominated as 1A to 1H, respectively. In a similar manner, the input to each AND gate 68 to 73 is represented as a rectangle and a designation. When the input to a particular AND gate is connected to a particular stage in a shift register, the rectangles representing the input and the stage contain the same designation. For example, the first stage in register 51 is designated as 1A and is connected to the input to gate 68 which is also designated as 1A.

Returning to FIG. 1, the outputs of multivibrators 27 to 32 are applied through attenuators 75 to 80 to summing bar 74. The signals on bar 74 are applied in parallel to attenuators 81 to 86 which are connected to the inputs of analog gates 90 to 95, respectively. An analog gate is defined here as an electronic switch that linearly conducts its input to its output when open.

When an AND-gate 68 to 73 develops an output signal, the related analog gate 90 to 95 is opened for the duration of the latter signal and its output comprises a burst of impulses. The particular impulses in a burst are generated by the multivibrators 27 to 32 that are randomly operated during the time interval when the analog gate is open. The bursts of impulses generated in this fashion and passed by analog gates 90 to 95 are illustrated by bursts of impulses 96 FIG. 3.

The probability that an analog gate will be opened during a predetermined time interval is controlled by the configuration of connections between the stages of registers 51 to 56 and the inputs of AND-gates 68 to 73, as represented in FIG. 2. In this arrangement, the probability for analog gate 90 is comparatively low ($p=½$, where seven is the number of inputs to AND-gate 68), while the probability for analog gate 95 is much greater ($p=½^2$). The probabilities for analog gates 91 to 94 have intermediate values. An analog gate 90 to 95 may be provided with a selected probability that it will open in a predetermined time interval by making the proper number of connections between the inputs of the associated AND-gate 68 to 73 and the stages in shift registers 51 to 56.

The durations of the open time intervals for an analog gate 90 to 95 are determined by the durations of the output signal of the related AND-gate gate 68 to 73, which in turn is controlled by (1) the configuration of connections between the related AND gate and the stages in shift registers 51 to 56 and (2) the frequencies of operation of multivibrators 61 to 66. The length of time an analog gate 90 to 95 is open, once it becomes open, may be adjusted by "bunching" the stages in shift register 51 to 56, i.e., by connecting the inputs of the AND-gate 68 to 73, related to the analog gate, to adjacent stages in the registers.

The amplitude of an impulse in a burst passed by an analog gate 90 to 95 is determined by the setting of the attenuator 75 to 80 associated with the multivibrator that developed the impulse and the setting of the attenuator 81 to 86 associated with the analog gate. An impulse generated by a multivibrator 25 to 32 is applied directly through summing bar 44 to modulator 45 and its amplitude is determined by the setting of the related attenuator 35 to 42. As an example of operation, assume that multivibrator 28 produces an impulse that is applied to summing bar 44 through attenuator 38. Assume further that the same impulse is sent via attenuators 76 and 84 to analog gate 93 and is passed by the analog gate to bar 44. The impulse passed through 93 may have an amplitude that is smaller, equal to, or larger than the impulse applied through attenuator 38, depending upon the settings of attenuators 38, 76, and 84. If the amplitude of one of the impulses is larger, it predominates as the impulses are applied to modulator 45.

Noise generator 97 produces a Gaussian noise signal, which is defined as a random noise signal with a Gaussian applitude distribution and a uniform phase distribution between 0 and $2\pi$ radians, and may be band limited.

Figure 3:
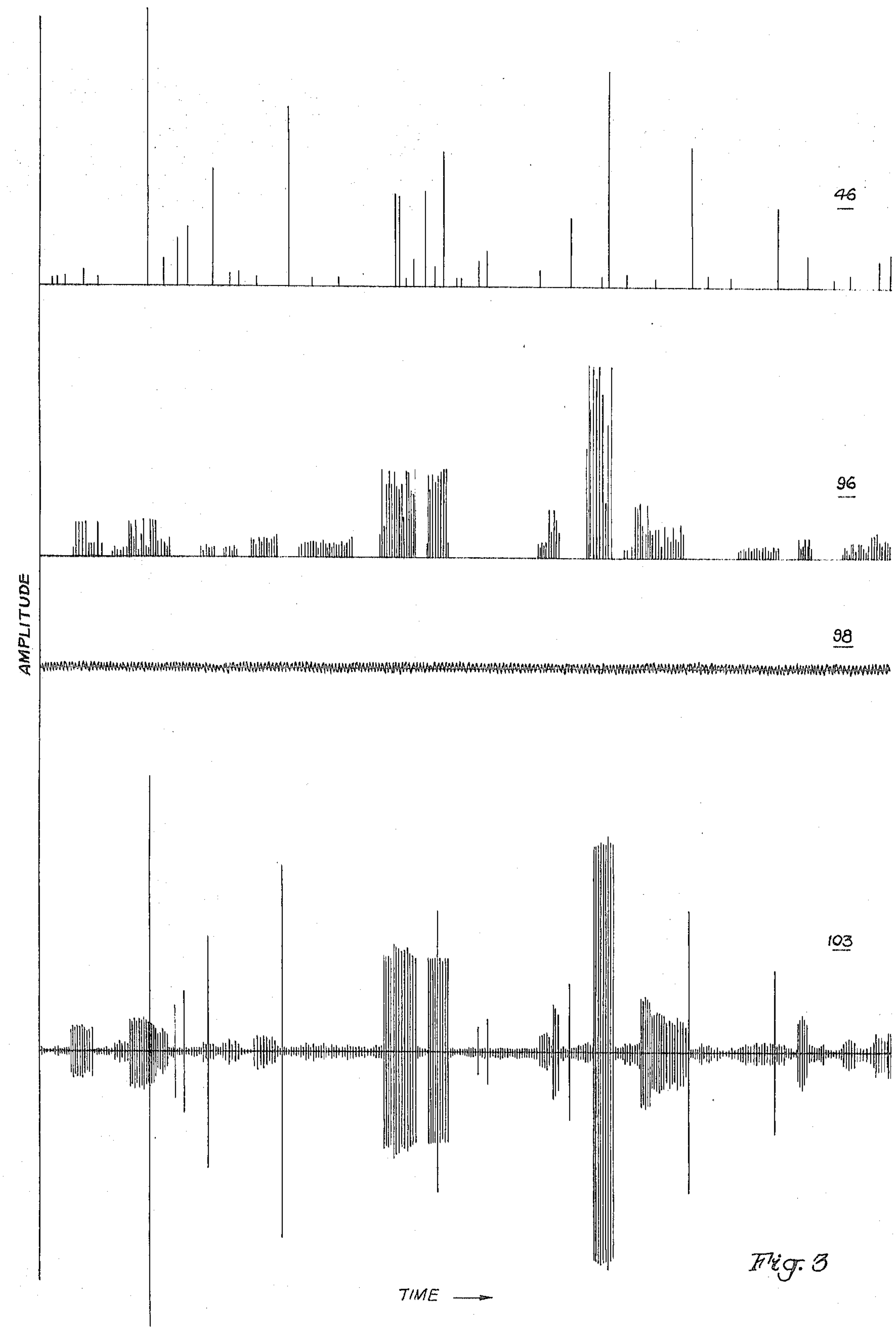

When switch 106 is closed and switch 105 is open, the Gaussian noise signal, represented as waveform 98 in FIG. 3, is transmitted through attenuator 99 and summing point 110 to band-pass filter 111. The noise signal is simultaneously transmitted through attenuator 100 to amplifier 101. The output of 101 is transmitted to lowpass filter 102 which passes a portion of the frequency band of the noise signal and applies it to modulator 45 as a modulating signal. There is no correlation between the noise signal applied to band-pass filter 111 through summing point 110 and the noise signal applied to 45 as a modulating signal. It is understood that instead of generator 97 two noise generators could be used, the output of one could be connected to attenuator 99 and the output of the other to attenuator 100.

When switch 105 is closed and 106 is open, the noise signal is sent through attenuator 99 to modulator 45. Again, there is no correlation between the noise signal applied through 105 and the noise signal applied to modulator 45 as a modulating signal. This arrangement is used preferably when the bandwidth of the noise signal is greater than or equal to approximately 70 times that of band-pass filter 111 so that the output of the simulator will contain true Gaussian noise.

Thus the impulses produced by multivibrators 25 to 32 and the bursts of impulses passed by analog gates 90 to 95, which occur at a finite number of discrete levels, are amplitude modulated in 45 by a Gaussian noise signal to become impulses with a continuous amplitude distribution. To illustrate the modulation process, assume that the amplitudes of impulses generated by multivibrators 31 and 32, after passing through attenuators 41 and 42, are 4 mv. and 1 mv., respectively. The root-mean-square level of the modulating Gaussian noise signal from filter 102 is such that the modulator input impulses with the discrete level of 4 mv. will appear at the output of modulator 45 with a Gaussian amplitude distribution with a mean value of 4 mv. and a standard deviation of approximately 1.2 mv. The 1 mv. impulses in the input to modulator 45 will appear at the output of 45 with a Gaussian distribution with a mean value of 1 mv. and a standard deviation of approximately 0.3 mv. Corresponding distributions are achieved for the impulses applied to the input of the modulator at other discrete levels.

Returning to FIG. 1, the output of modulator 45 is transmitted to band-pass filter 111. The impulses in the output of 45, which are illustrated by 46 and 96 in FIG. 3, cause the filter to "ring" or oscillate. This produces the symmetrical waveform 103 which forms the output of the simulator. As an example, assume that the three impulses 107 in FIG. 4 are applied to the filter. In response to the impulses the filter provides an output represented by waveform 108 which has an envelop of oscillations represented by dotted lines 109. The frequency and length of time of oscillation associated with 108 are determined by the center frequency and bandwidth of filter 111. It is noted that the time scale in FIG. 4 is expanded while the time scale for waveform 103 is compressed so that only the amplitude of the envelope is shown.

Characteristics of filter 111 such as center frequency, bandwidth and output amplitude are determined by the needs and requirements of each individual application of the noise simulator. In this connection it will be understood that a radio receiver is in effect a band-pass filter with gain (amplification) added. The atmospheric noise impulses in nature make the receiver ring to produce a waveform similar to the one represented by 103 in FIG. 3. If the user has a requirement for simulated noise that has a narrow bandwidth, then the bandwidth of filter 111 can be as wide or wider than the bandwidth of the required noise. Thus, the characteristics of the filter may vary widely depending on the requirements of the user.

In a typical operation, the following procedure is followed to simulate to a first approximation noise in the low frequency (LF) or very low frequency (VLF) band:

1. Attenuators 35 to 42 are adjusted to provide impulses of relatively large amplitude.

2. Attenuators 81 to 86 are adjusted to provide bursts of impulses of negligible amplitude. In some portions of the VLF band the bursts are substantially eliminated.

3. Attenuator 99 is adjusted so that the level of Gaussian noise signal developed by generator 97 matches a desired low level background noise.

4. If distant atmospheric noise is to be simulated, attenuators 35 to 42 and 81 to 86 are set to provide relatively weak signals. Conversely, if local storms are to be simulated, the attenuators are set to provide strong signals.

5. If local storms are to be simulated, the output stages of register 12 are "bunched", as described above.

In general, when atmospheric noise in the VLF and LF band is simulated to a first approximation attenuators 36 to 42 are adjusted to provide large amplitude impulses and attenuators 81 to 86 are adjusted to provide very low amplitude bursts of impulses or, depending upon the portion of the band simulated, to substantially eliminate the bursts. When noise in the high frequency (HF) band is simulated to a first approximation, the attenuators are adjusted to obtain high level bursts and low level impulses or to substantially eliminate the impulses, depending on the portion of the HF band wherein the noise is simulated. Finally, when noise in the middle frequency (MF) band is simulated to a first approximation, the attenuators are set so that the amplitudes of the impulses and the amplitudes of the bursts of impulses are substantially equal.

When it is desired to simulate atmospheric noise in the VLF, LF, MF, or HF bands to a close approximation, statistical data that characterizes the noise in the band is used to set the parameters in the simulator. The output of the simulator will then simulate to a high degree the noise that is likely to occur in the band.

We claim:

1. A noise simulator comprising:
means for generating random impulses having a nonperiodic repetition rate, each impulse having a selected amplitude and a selected probability of occurrence,
means for generating a Gaussian noise signal,
an amplitude modulator having an input,
means for applying the random impulses to the input of said modulator,
means for applying a portion of the frequency band of said noise signal to said modulator as a modulating signal,
filtering means having a predetermined center frequency and bandwidth, and
means for applying the output of said amplitude modulator to said filtering means.

2. The noise simulator set forth in claim 1 including:
means for applying said Gaussian noise signal to said filtering means.

3. The noise simulator set forth in claim 1 wherein said means for generating the random impulses comprises:
a shift register having a plurality of stages,
a binary noise generator having an output connected to the input of said shift register,
means for clocking said noise generator for shifting said register,
a plurality of AND gates, each having a plurality of inputs, each input being connected to a respective stage in said register in a desired configuration, and
a plurality of one-shot multivibrators, each connected to the output of a respective one of said AND gates.

4. The noise simulator set forth in claim 1 including:
means for generating bursts of impulses having a nonperiodic repetition rate and durations having random values, each impulse in a burst having a selected amplitude, and
means for applying said bursts of impulses to the input of said modulator.

5. The noise simulator set forth in claim 4 wherein said means for generating the bursts of impulses comprises:
a plurality of shift registers, each having a plurality of stages,
a binary noise generator,
means for applying the output of said binary noise generator in parallel to the inputs of said shift registers,
means for shifting each of said shift registers,
a plurality of AND gates, each having a plurality of inputs connected to the stages of said shift registers in a desired configuration,
a plurality of analog gates, each connected to an output of a respective one of said AND gates in such a way that each analog gate is opened by an output signal of its related AND gate, and
means for applying said random impulses in parallel to the inputs of said analog gates.

6. The noise simulator set forth in claim 4 wherein said means for generating the random impulses comprises:
a shift register having a plurality of stages,
a binary noise generator having an output connected to the input of said shift register,
means for clocking said noise generator and for shifting said register,
a plurality of AND gates, each having a plurality of inputs, each input being connected to a respective stage in said register in a desired configuration, and
a plurality of one-shot multivibrators, each connected to the output of a respective one of said AND gates.

7. The noise simulator set forth in claim 4 including:
means for applying said Gaussian noise signal to said filtering means.

8. A noise simulator comprising:
means for generating bursts of impulses having a nonperiodic repetition rate and durations having random values, each impulse in a burst having a selected amplitude,
means for generating a Gaussian noise signal, an amplitude modulator having an input,
means for applying said bursts of impulses to the input of said modulator, and
means for applying a portion of the frequency band of said noise signal to said modulator as a modulating signal,
filtering means having a predetermined center frequency and bandwidth, and
means for applying the output of said amplitude modulator to said filtering means.

9. The noise simulator set forth in claim 8 including:
means for applying said Gaussian noise signal to said filtering means.

10. The noise simulator set forth in claim 8 wherein said means for generating the bursts of impulses comprises:
a plurality of shift registers, each having a plurality of stages,
a binary noise generator,
means for applying the output of said binary noise generator in parallel to the inputs of the shift registers,
means for shifting each of said shift registers, a plurality of AND gates, each having a plurality of inputs connected to the stages of said shift registers in a desired configuration,
a plurality of analog gates, each connected to an output of a respective one of said AND gates in such a way that each analog gate is opened by an output signal of its related AND gate, and
means for applying said random impulses in parallel to the inputs of said analog gates.

11. A noise simulator comprising:
means for generating random impulses having a nonperiodic repetition rate, each impulses having a selected amplitude and a selected probability of occurrence,
means for generating a Gaussian noise signal,
an amplitude modulator having an input,
means for applying the random impulses to the input of said modulator,
means for applying said Gaussian noise signal to the input of said modulator,
means for applying a portion of the frequency band of said noise signal to said modulator as a modulating signal,
filtering means having a predetermined center frequency and bandwidth, and
means for applying the output of said amplitude modulator to said filtering means.

12. The noise simulator set forth in claim 11 wherein said means for generating the random impulses comprises:
a shift register having a plurality of stages,
a binary noise generator having an output connected to the input of said shift register,
means for clocking said noise generator and for shifting said register,
a plurality of AND gates, each having a plurality of inputs, each input being connected to a respective stage in said register in a desired configuration, and
a plurality of one-shot multivibrators, each connected to the output of a respective one of said AND gates.

13. The noise simulator set forth in claim 11 including:
means for generating bursts of impulses having a nonperiodic repetition rate and durations having random values, each impulse in a burst having a selected amplitude, and
means for applying said bursts to the input of said amplitude modulator.

14. The noise simulator set forth in claim 13 wherein said means for generating the bursts of impulses comprises:
a plurality of shift registers, each having a plurality of stages,
a binary noise generator,
means for applying the output of said binary noise generator in parallel to the inputs of said shift registers,
means for shifting each of said shift registers,
a plurality of AND gates, each having a plurality of inputs connected to the stages of said shift registers in a desired configuration,
a plurality of analog gates, each connected to an output of a respective one of said AND gates in such a way that each analog gate is opened by an output signal of its related AND gate, and
means for applying said random impulses in parallel to the inputs of said analog gates.

15. The noise simulator set forth in claim 11 wherein said means for generating the random impulses comprises:
a shift register having a plurality of stages,
a binary noise generator having an output connected to the input of said shift register,
means for clocking said noise generator and for shifting said register,
a plurality of AND gates, each having a plurality of inputs, each input being connected to a respective stage in said register in a desired configuration, and
a plurality of one-shot multivibrators, each connected to the output of a respective one of said AND gates.

16. A noise simulator comprising:
means for generating bursts of impulses having a nonperiodic repetition rate and durations having random values, each impulse in burst having a selected amplitude, means for generating a Gaussian noise signal, an amplitude modulator having an input, means for applying said bursts of impulses to the input of said modulator, means for applying said noise signal to the input of said modulator, filtering means having predetermined center frequency and bandwidth and
means for applying the sum of the Gaussian noise signal and the output of said amplitude modulator to said filtering means.

17. The noise simulator set forth in claim 16 wherein said means for generating the bursts of impulses comprises:
a plurality of shift registers, each having a plurality of stages,
a binary noise generator,
means for applying the output of said binary noise generator in parallel to the inputs of said shift registers,
means for shifting each of said shift registers,
a plurality of AND gates, each having a plurality of inputs connected to the stages of said shift registers in a desired configuration,
a plurality of analog gates, each connected to an output of a respective one of said AND gates in such a way that each analog gate is opened by the output signal of its related AND gate, and
means for applying said random impulses in parallel to the inputs of said analog gates.

* * * * *